United States Patent Office 3,465,870
Patented Sept. 9, 1969

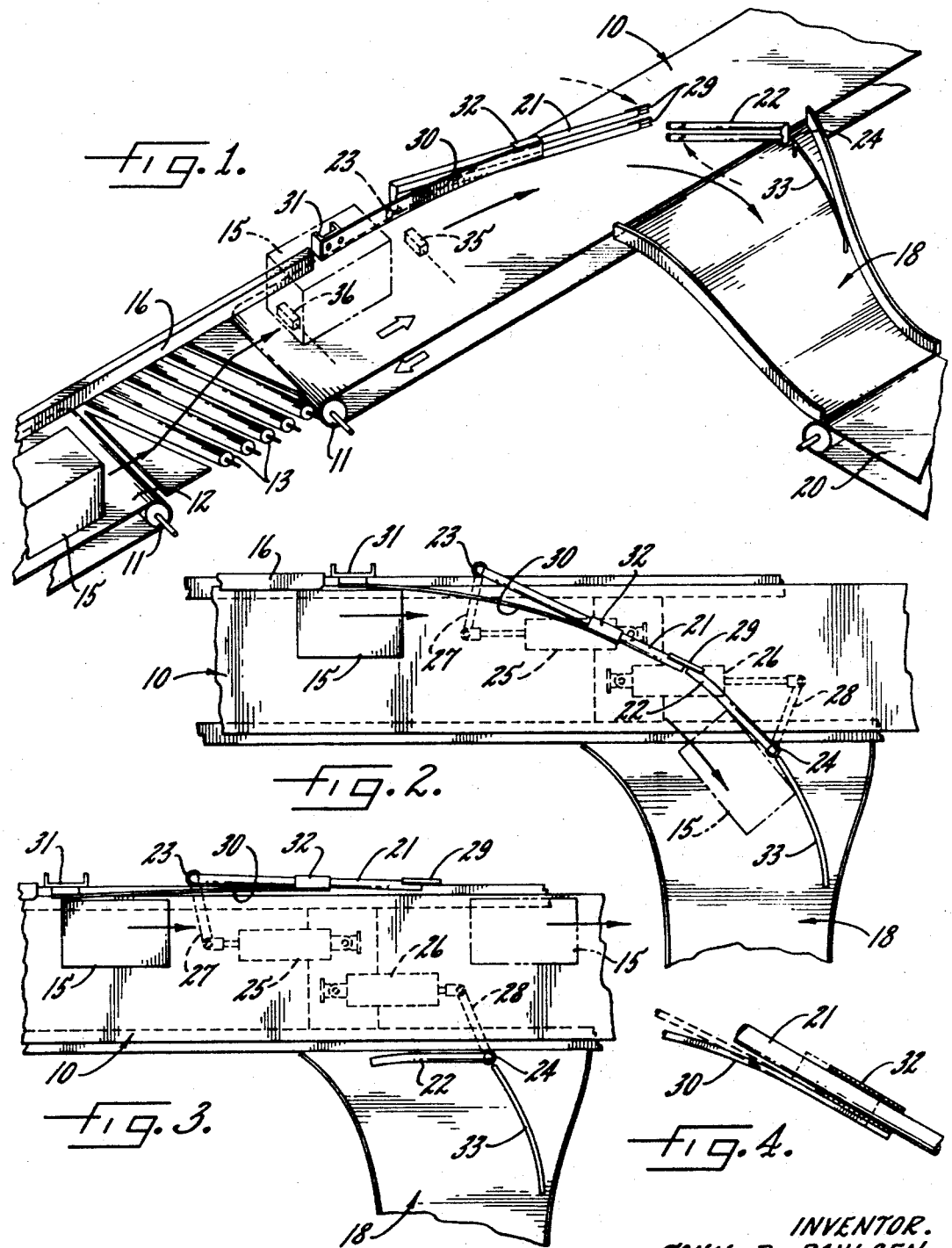

3,465,870
DIVERTER FOR CONVEYOR SYSTEMS
John D. Paulsen, Naperville, Ill., assignor, by mesne assignments, to Ermanco Incorporated, Grand Haven, Mich., a corporation of Michigan
Filed Oct. 11, 1967, Ser. No. 674,466
Int. Cl. B65g 47/34
U.S. Cl. 198—188                              6 Claims

ABSTRACT OF THE DISCLOSURE

A diverter for conveyor systems is described in which two arm segments pivoted on opposite sides of the conveyor swing together and join to divert an object from the conveyor into a diversion station, and in which a resilient catcher plate is provided to cushion the initial stages of the diversion sequence.

DESCRIPTION OF THE INVENTION

This invention relates to conveyor systems in which it is desired to selectively divert a moving object from the conveyor into a diversion station. In particular, the invention concerns an improved diverter for use with relatively high speed conveyors handling conveyed articles of varying sizes and weights as well as those which are relatively fragile.

Conveyor systems are used today to transport a wide range of articles in many applications. Such systems are commonly utilized in manufacturing and assembly operations, and also find particular utility in packaging and sorting operations. One example of the latter use is in preparing produce or merchandise for delivery from a central warehouse to a large number of delivery points, each of which may require a different assortment of goods. It is in applications such as these that the need arises for a diverter which is capable of efficiently transferring individual articles from a rapidly moving conveyor into one or more diversion stations, and in which the articles conveyed are in a mix consisting of widely varying sizes, shapes, and weights. The diversion stations may consist simply of loading points for a fleet of delivery trucks or they may comprise further conveyors for transporting the articles to yet another point. In either case, it is necessary for the diverter to be capable of quickly and accurately transferring an article from the moving conveyor belt to the diversion station without damage to the article diverted, and without delaying or interfering with the progress of other articles on the conveyor.

Diverters presently exist which are satisfactory in applications where the articles to be diverted are not too easily damaged or in which it is possible to operate at a relatively low conveyor speed. However, in order to utilize modern conveyor systems at maximum effectiveness, it is necessary to use as high a conveyor speed as possible to accommodate a greater flow of goods without spacing them too closely on the conveyor for selective diversion. Higher speeds have heretofore caused difficulty because of the danger of breakage in diverting relatively fragile packages. Certain products such as packaged eggs are so breakable that it is difficult or impossible to handle them at increased speeds on existing conveyor diversion systems.

In view of these requirements, a primary object of the present invention is to provide an improved conveyor diversion system which is capable of transferring packages of widely varying shape, size and weight from a rapidly moving conveyor into a diversion station with a minimum of shock or impact, and without the need for adjustment. It is intended that the diverter of the present invention be adapted for use in conveyor systems having a skewer or similar device for channeling the articles conveyed along one edge of the conveyor path so that the diversion path defines a smooth continuous curve across the conveyor and into the diversion station.

Other objects and advantages of the invention will become apparent upon reading the following detailed description and upon reference to the drawings, in which:

FIG. 1 is a perspective of an exemplary conveyor system utilizing a diverter constructed according to the present invention showing the diverter arm segments partially extended;

FIG. 2 is a plan view of the diverter mechanism shown in FIG. 1 with the arm segments fully extended for diversion of an object from the conveyor;

FIG. 3 is a plan view similar to FIG. 2 showing the diverter arm segments in the retracted position; and FIG. 4 is an enlarged fragmentary view of the diverter of FIG. 1, illustrating in detail the point of sliding attachment of the catcher plate to the leading diverter arm segment.

While the invention will be described in connection with a particular embodiment, it will be understood that it is not intended to so limit the invention, but it is instead intended to cover all alternative and equivalent constructions as may be included within the spirit and scope of the invention as defined by the appended claims.

Turning to the drawings, there is shown in FIG. 1 a diverter exemplifying the present invention as employed in connection with a conveyor belt system. The main conveyor belt 10 is of conventional design, being supported by rollers 11 and being powered so that its upper surface is continuously moving in the desired direction of package movement. It is supplied by a preliminary conveyor belt 12 which is supported for movement on rollers 11 in the same manner as the main conveyor 10. In the illustrative embodiment, a skewing device is employed which causes conveyed objects to be lined up along one edge of the conveyor 10 in a uniform manner. The latter device is commonly used because objects entering or moving along the conveyor system are often randomly distributed across the width of the preliminary belt 12, giving rise to difficulties in diversion.

The skewer consists simply of a plurality of parallel rollers 13 disposed to rotate at an angle to the general direction of conveyor movement. The skewer rollers 13 may be powered or not, depending on the type of objects to be conveyed. An approaching package 15 which encounters the skewer rollers 13 upon coming from the preliminary conveyor 12 is conveyed sideways as well as forward until one edge contacts a channel-defining member or bumper 16 disposed parallel and adjacent to the path of conveyor movement. In this manner all packages emerging from the preliminary conveyor 12 are uniformly aligned with one edge against the channel member 16 as they emerge onto the main conveyor 10.

Pursuant to a principal feature of the invention, the diverter mechanism is constructed in two operating sections which swing out from opposite sides of the conveyor 10 to join at their center and define a smooth continuous diversion path for the package 15. In the illustrative embodiment, a diversion station is provided which consists of a diversion chute 18 and a branch conveyor 20 which carries diverted objects away from the diversion station. The diverter is constructed with a pair of cooperating diverter arm segments 21, 22. A leading arm segment 21 is pivoted about a pivot point 23 on one side of the belt 10, and a trailing arm segment 22 is similarly pivoted about a pivot point 24 on the opposite side. Beneath the conveyor 10, power actuators 25, 26 are connected to the arm segments 21, 22 by operating levers 27, 28. The actuators 25, 26 may, for example, be pneumatic cylinders and may be controlled in any suitable manner. They are preferably of the double-acting type so that the arm segments 21, 22 may be selectively extended and retracted by the application of an electrical operating signal.

In the retracted or rest position, as best shown in FIG. 3, both arm segments 21, 22 lie parallel to the direction of conveyor movement and are positioned out of the way of the conveyor path. In this position, the leading arm segment 21 extends from its pivot 23 in a direction facing downstream relative to the direction of conveyor movement. As a further feature of the invention, in the retracted or rest position the trailing arm segment 22 is positioned with its pivot 24 at or near the downstream edge of the diversion chute 18, and this arm faces upstream relative to the direction of conveyor movement. It may be seen that in this position the trailing arm segment 22 acts as a barrier to packages which may become tipped or jostled away from the channel member 16 and are thereby effectively prevented from inadvertently tumbling into the diversion chute 18.

Preferably, and according to another aspect of the invention, the arm segments 21, 22 are constructed so as to divert objects from the conveyor 10 with a minimum of sliding contact area between the diverter and the package 15 to be diverted. This is achieved by constructing the diverter arm segments 21, 22 from round tubing, thereby providing virtual line contact against straight-sided or convex packages. In order that the diverter may be of sufficient height to prevent tall or top-heavy packages from tumbling over it, the arm segments 21, 22 are constructed from parallel tube elements, one stacked above the other. As a result, the effect of substantially line contact between the diverter and the package is achieved while providing a diverter that is both high enough to prevent packages from toppling over and low enough to prevent smaller packages from passing underneath.

As a further adjunct to this aspect of the invention, a stop member 29 is provided on one of the arm segments 21, 22 so that the arms will meet when extended by their pneumatic cylinders 25, 26 to define a smooth path for the diverted objects. In the illustrative embodiment, the stop 29 consists of a short channel section of V-shaped cross section attached to the tip of each of the tube elements of the leading diverter arm segment 21. When the arm segments 21, 22 are extended, the tube elements of the two segments are thus positioned in registry with one another to form a continuous diversion path from one side of the conveyor 10 to the other.

The greatest impact and diversion forces are encountered in the initial stages of the diversion operation. This often causes breakage in existing systems, but in the present invention this difficulty is avoided by the provision of a resilient catcher member 30 which fairs the leading diverter arm segment 21 smoothly into the line of the channel members 16 and absorbs the impact of initial contact so that the diversion is initiated smoothly and gradually. For this purpose, the catcher member 30 is preferably constructed of a length of relatively flexible resilient material such as spring steel and is fixed at its leading end to an attachment post 31. As may be seen from FIG. 3, when the leading diverter arm segment 21 is in the retracted position the catcher member 30 forms substantially an extension of the channel-defining element 16 so that the flow of objects on the conveyor 10 proceeds undisturbed. When in the extended position, as shown in FIG. 2, the attachment point on the post 31 remains fixed, while the opposite end of the catcher member 30 is carried across the surface of the belt 10 by the moving arm segment 21. As a result, a smooth unbroken curve is formed between the channel element or bumper 16 and the diversion path formed by the two interlocking arm segments 21, 22.

An important aspect of the invention is contained in the impact absorbing function of the catcher member 30. This is achieved by attaching the downstream end of the catcher member 30 to the leading diverter arm segment 21 by a loose-fitting slidable joint instead of a rigid fixed attachment such as that used at the leading edge of the catcher member where it joins the attachment post 31. As best shown in FIG. 4, the trailing end of the catcher member 30 is simply formed as a box section 32 which slips over the tube elements of the leading diverter arm segment 21 and is freely slidable thereon. The box section 32 additionally prevents the catcher member 30 from departing from the desired smooth contour, since the box section is free only to slide up and down the length of the leading arm segment 21, and cannot lift or pull away from the arm segment at this point.

In operation, and as illustrated in FIG. 2, the movement of the leading diverter arm segment 21 from the rest position into the extended position causes the catcher member 30 to be bent smoothly throughout from its fixed end at the attachmet post 31 to its other end at the slidable box section 32 retained by the arm segment 21. The bend in the catcher member 30 thereby causes it to bow away from the leading diverter arm pivot 23, providing a smooth contour at the transition point where a package 15 enters the diverter. More importantly, however, the slidable attachment of the box section 32 on the leading diverter arm segment 21 provides the catcher member 30 with an additional "give" or degree of freedom to bend at its midpoint so that a package 15 impacting at this region is cushioned rather than being bounced or jolted as it enters the diverter. It has been found in practice that this is the most critical point in the diversion operation and that the elimination of breakage at this point is the keystone to successful operation of the system. When a heavy or improperly positioned package 15 encounters the diverter of the present invention, the catcher member 30 tends to be compressed slightly toward the adjacent arm pivot 23 because of the movement allowed by the slidable box section 32 at the opposite end. When the impact has thus been sufficiently absorbed, the package 15 is turned smoothly in the direction of the desired diversion and follows the contour established by the catcher member, the diverter arm segments 21, 22 and an auxiliary guide 33 into the diversion chute 18 and onto the branch conveyor 20. As best shown in FIG. 4, the impact of such a heavy or off-center package 15 causes the catcher member 30 to deflect, drawing the box section 32 along the tube elements of the leading diverter arm segment 21. When the impact has been absorbed the catcher member 30 returns to its original shape and position.

To complete the smooth path thus formed, and according to a further aspect of the invention, an auxiliary guide segment 33 is located in the diversion chute 18 and forms an extension of the diversion path. When the diversion arm segments 21, 22 are in the extended position, a diverted package 25 will be directed into the diversion chute 18 at an angle to the direction of conveyor movement. The auxiliary guide 33 is therefore located so as to form a continuation of the curvilinear path of the diversion, and the package 15 is smoothly directed down the diversion chute 18 and onto the branch conveyor 20 as a result.

In a typical operating installation, it has been found that successful diversions can be made at conveyor belt speeds from 450 feet per minute to well over 600 feet per minute. With the diverter of the particular illustrative embodiment the pneumatic cylinders 25, 26 are capable of moving the diverter arm segments 21, 22 from the retracted position to the extended position and back again in 0.5 second. With this system, successful diversions can be made of widely varying types of packages ranging from small cheese boxes between six and eight inches in length and twenty-four inch high egg cartons weighing between forty and fifty pounds. In actual tests the system has even successfully diverted a single cardboard carton of a dozen eggs with no breakage, even at the relatively high speed of 600 feet per minute.

The diverter system of the present invention may be manually controlled, but at the increased speeds made possible by the improvements of the present invention automatic control is preferable. In the illustrative embodiment, such a control means is indicated schematically by a magnetic sensor 35 located just forward of the diversion station. Such a sensor is used in conjunction with a belt 10 constructed with implanted magnetic material which is capable of retaining recorded information in much the same way as magnetic tape. Information corresponding to the position and length of the individual packages carried by the conveyor is placed on the belt 10 by a recording head 36 located ahead of the diverter. When the sensor 35 picks up a magnetic signal corresponding to a predetermined code for its associated diversion station, the pneumatic cylinders 25, 26 are actuated to close the diverter arm segments 21, 22 and divert that particular package 15 into the diversion chute 18.

The following is claimed as my invention:

1. In a conveyor system having channel-defining means and skewing means for positioning objects carried thereon so that a common edge is positioned adjacent the channel-defining means, a diverter comprising, in combination, an arm carried adjacent the side of the conveyor path having the channel-defining means, and swingable across the path of conveyor movement, and a resilient catcher member having a forward end fixed parallel to the direction of conveyor movement at a point adjacent the channel-defining means having a trailing end carried by the arm for bending movement across the path of conveyor movement.

2. A diverter as defined in claim 1 in which the trailing end of the resilient catcher member is resiliently shiftable along a portion of the length of said arm.

3. A diverter as defined in claim 1 in which the resilient catcher member consists of spring metal, and the trailing end is slidably retained on said arm to form a curvilinear extension of the channel-defining means.

4. A diverter as defined in claim 1 in which said arm has a rest position adjacent the conveyor path and extending downstream thereof, and the catcher member has a rest position corresponding to the rest position of said arm in which the catcher member and arm lie in a substantially parallel retracted position adjacent the path of conveyor movement and constitute a substantially linear extension of the channel-defining means, and in which the arm is spaced downstream of the point of fixed attachment of the catcher member, whereby a substantial portion of the catcher member is resiliently spaced from said arm when in the extended position to allow for flexing upon encountering an object to be diverted from the conveyor path.

5. In a conveyor system having a diversion station adjacent a path of conveyor movement, a diverter comprising in combination, a first pivot on one side of the conveyor path opposite the diversion station, a first arm segment carried by the first pivot for movement across the conveyor path, a second pivot positioned on the other side of the conveyor path, a second arm segment carried by the second pivot for movement across the conveyor path, said first and second arm segments coinciding and meeting at a point approximately equidistant from their pivots to form a continuous path into the diversion station, a diversion chute, a fixed diversion guide carried by the chute to form an extension of the diversion path defined by the extended arm segments, and power means for selectively extending and retracting the arm segments.

6. In a conveyor system having a diversion station adjacent a path of conveyor movement, a diverter comprising in combination, a first pivot on one side of the conveyor path opposite the diversion station, a first arm segment carried by the first pivot for movement across the conveyor path, a second pivot positioned on the other side of the conveyor path, a second arm segment carried by the second pivot for movement across the conveyor path, said first and second arm segments coinciding and meeting at a point approximately equidistant from ther pivots to form a continuous path into the diversion station, movement limiting means on one arm segment engageable with the other arm segment whereby the arm segments are engageable upon extension to define a continuous diversion path, and power means for selectively extending and retracting the arm segments.

References Cited

UNITED STATES PATENTS

| 2,986,264 | 5/1961 | Holben | 198—188 |
| 3,006,457 | 10/1961 | Weiss | 198—188 |
| 3,128,872 | 4/1964 | Gaitten | 198—188 |

FOREIGN PATENTS 1,234,749   10/1960   France.

RICHARD E. AEGERTER, Primary Examiner